July 17, 1951  E. F. SCHMUTZLER  2,561,235
CAM RELEASED CLUTCH FOR GRAIN DRILLS
Filed May 23, 1946  3 Sheets-Sheet 1

INVENTOR
EUGENE F. SCHMUTZLER
BY
ATTORNEYS

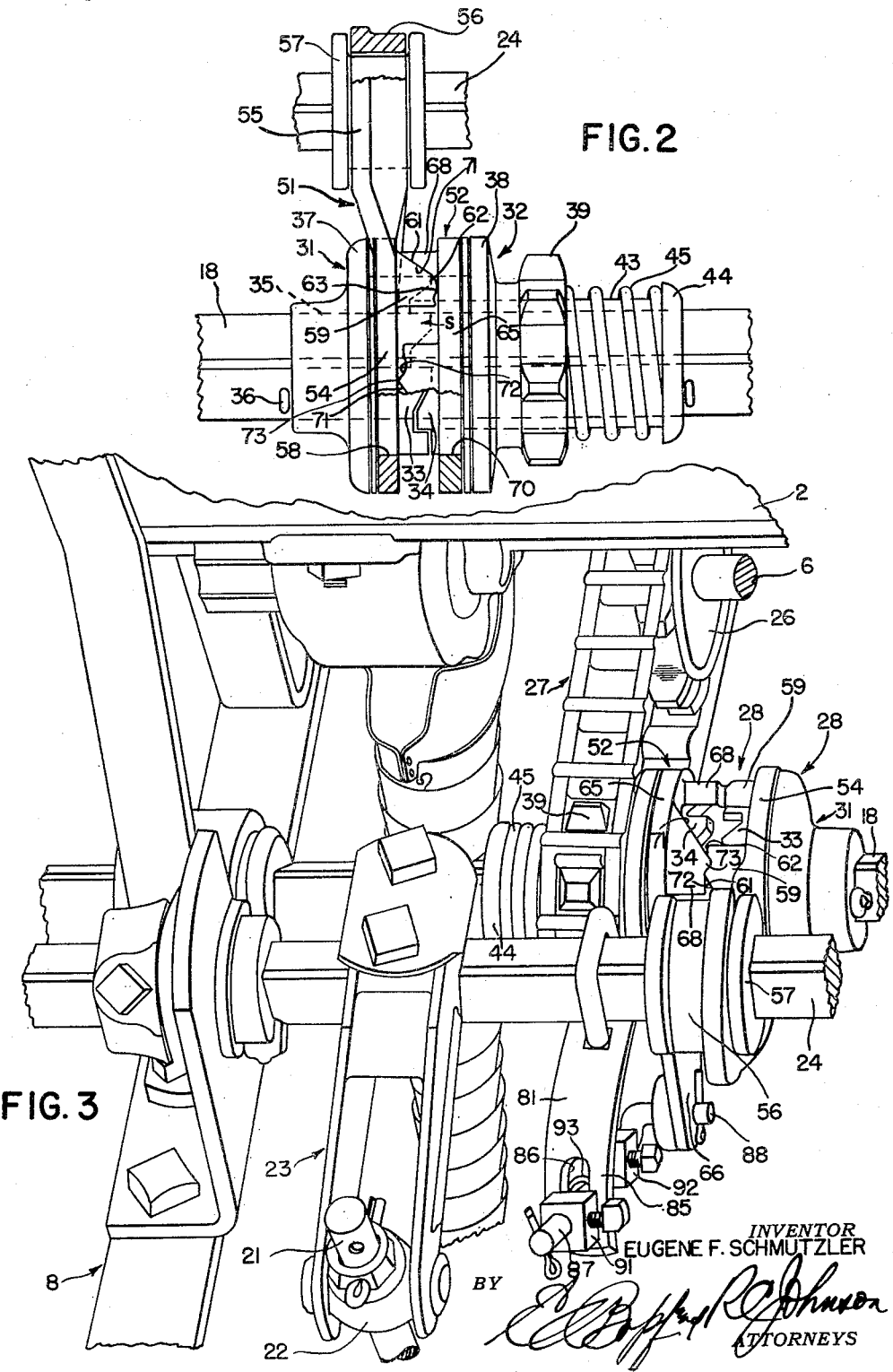

INVENTOR
EUGENE F. SCHMUTZLER

Patented July 17, 1951

2,561,235

UNITED STATES PATENT OFFICE 2,561,235

CAM RELEASED CLUTCH FOR GRAIN DRILLS

Eugene F. Schmutzler, Beaver Dam, Wis., assignor to John Deere Van Brunt Company, a corporation of Wisconsin Application May 23, 1946, Serial No. 671,732

4 Claims. (Cl. 192—89)

The present invention relates generally to agricultural implements and more particularly to seeding machines, such as a grain drill or the like.

The object and general nature of the present invention is the provision of a new and improved drive for the fertilizer mechanism of a grain drill, although in its broadest aspects, the present invention is not to be limited to grain drills or the like. A more specific feature of the present invention is the provision of a new and improved throwout clutch which is of simple inexpensive construction. A further feature of this invention is the provision of a controllable implement disconnect clutch especially constructed and arranged so that it is easily and conveniently serviced and assembled and in which new and improved clutch operating mechanism is provided, such as, for example, a new and improved way of mounting one of the clutch controlling cam members without extraneous frame parts and other unnecessary complications.

A further feature of this invention, of particular importance in connection with grain drills having a fertilizer attachment, is the provision of a disconnect clutch for transmitting the drive from a jackshaft to the fertilizer shaft by means which makes it possible to maintain the fertilizer distributing mechanism out of gear while not affecting the control of other parts of the machine.

These and other objects and advantages of the present invention will be apparent to those skilled in the art after a consideration of the following detailed description, taken in conjunction with the accompanying drawings.

In the drawings:

Figure 2 is an enlarged fragmentary plan view of the fertilizer drive clutch mechanism and associated parts, showing the same in an engaged position.

Figure 3 is a fragmentary perspective view showing the clutch in its disengaged position, as when the furrow openers of the grain drill are raised.

Figure 1:
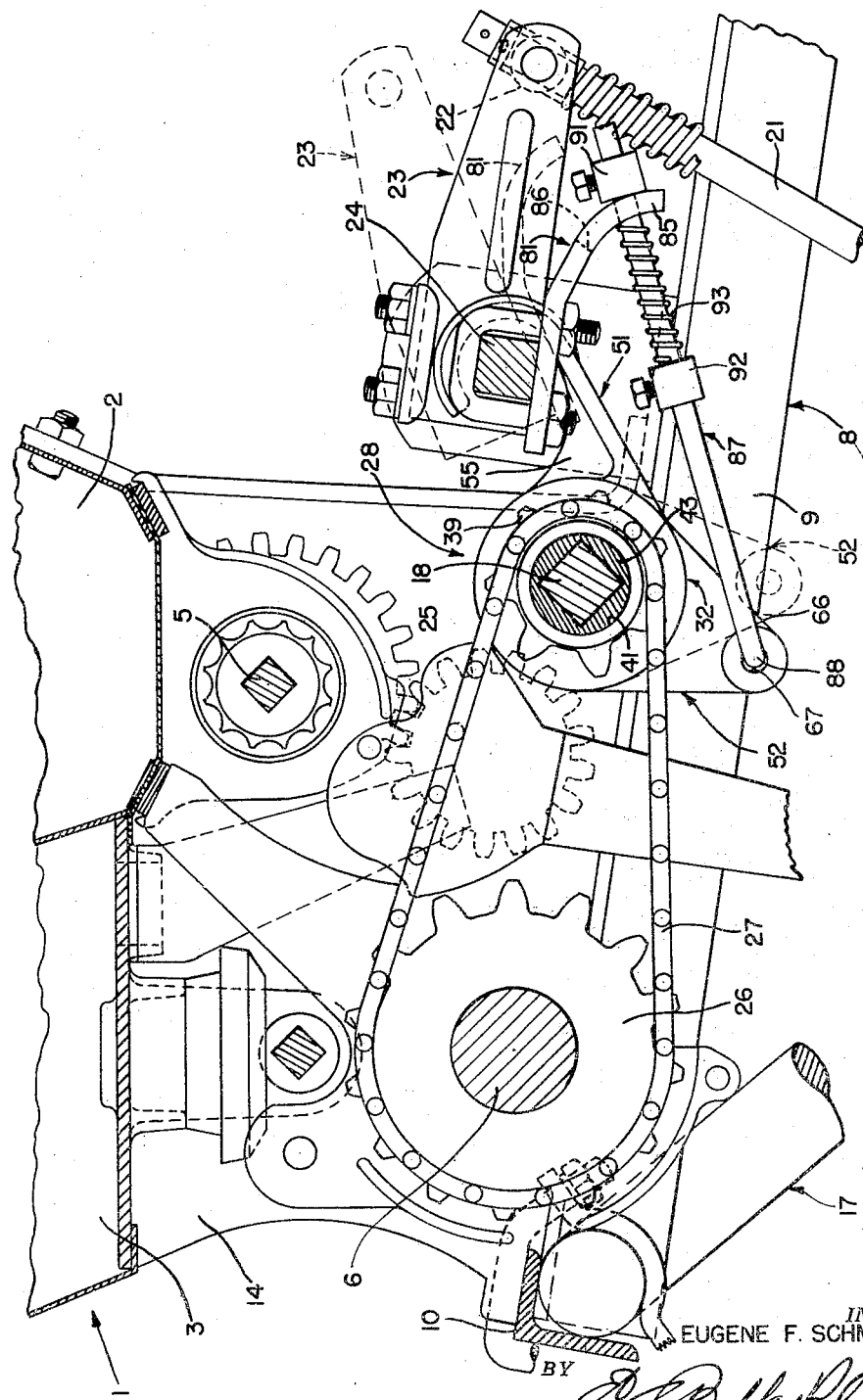
Figure 1 is an end view of a grain drill in which the principles of the present invention have been incorporated, certain parts being broken away in order to illustrate the clutch construction somewhat more clearly.

Referring now to the drawings, more particularly to Figure 1, the implement in which the principles of the present invention have been illustrated comprises a grain drill, indicated in its entirety by the reference numeral 1, which is made up of a transversely extending seed box 2 and an adjacent fertilizer box 3, each box carrying along the bottom thereof seed and fertilizer dispensing units of conventional construction. The seeding units are driven by a seeding shaft 5 and the fertilizer distributing units are driven by a jack shaft 6. The grain drill 1 includes a frame 8 which comprises generally longitudinally extending frame members 9 and a rear transverse frame member 10, these members preferably being in the form of angles suitably connected together. The frame 8 also includes a hitch structure by which the drill may be connected to a source of propelling power such as a tractor or the like. The seed and fertilizer boxes or containers are supported on end brackets 14, reenforced by suitable braces where necessary, the box ends 14 including suitable means whereby they may be bolted to the end angles 9 of the grain drill frame. Each end of the frame is supported on a ground wheel supported for rotation on the lower end of a drop axle construction 17, and each ground wheel is connected with a driving pinion which serves to drive a jackshaft 18 through suitable sprocket gearing generally similar to that shown in U. S. Patent 2,437,094, issued March 2, 1948, to William A. Hyland. The grain drill also includes conventional furrow openers which may be raised and lowered through rods 21 connected at their upper end through swivels 22 with the forward ends of associated pressure arms 23 that are fixed at their rear ends by any suitable means to a rockable pressure shaft 24. Suitable means (not shown), such as a hand lever or a power operated unit, are provided for rocking the rockshaft 24 to raise or lower the tools. It will be noted that the rockshaft 24 is mounted on the grain drill frame 8 adjacent the jackshaft 18. Through suitable controlling gearing (not shown) the rotation of the jackshaft 18 is transmitted to the seeding shaft 5, such gearing usually being disposed adjacent the end of the grain drill, and through other connections, with which the present invention is more particularly concerned, a drive is also transmitted from the jackshaft 18 rearwardly to the fertilizer distributor jackshaft 6. Preferably, a sprocket gear 26 is mounted on the shaft 6 and receives a sprocket chain 27 which is driven through a disconnect clutch structure, indicated in its entirety by the reference numeral 28 that is mounted on the jackshaft 18. The latter shaft, as well as the rockshaft 24, is supported on the grain drill frame 8 by suitable bearings of conventional construction so far as the present invention is concerned.

As best shown in Figure 2 et seq., the disconnect clutch 28 includes a pair of clutch elements 31 and 32 which are provided with cooperating clutch teeth 33 and 34 connectible and disconnectible by axial shifting of one of the clutch elements, namely, the clutch element 32, relative to the other clutch element 31, which has a square opening 35 (Figure 2) whereby it is non-rotatably connected with the jackshaft 18, which is preferably square in cross section. A pin, cotter or other means, as indicated at 36, holds the clutch element 31 against axial displacement outwardly of the clutch. A central flange 37 is formed on the clutch element 31, and a similar central flange 38 is formed on the driven clutch element 32. Also, the latter element is provided with sprocket teeth forming a sprocket pinion 39 over which the forward portion of the chain 27 is trained. The driven clutch element 32 has a central opening 41 larger than the jackshaft 18, the element 32 being mounted for rotation on a supporting bushing or bearing 43 that is disposed on the jackshaft 18, forming a support for the rotatable clutch element 32. An abutment flange 44 is carried at the outer end of the bearing bushing 43 and receives the outer end of a spring 45, the inner end of which bears against the sprocket pinion section 39 of the clutch element 32. When the clutch teeth 33 and 34 are engaged, the driven clutch element 32 and the sprocket pinion 33 are driven from the jackshaft 18 through the driving clutch element 31, and when the clutch teeth 33 and 34 are disconnected, the drive from the jackshaft 18 to the fertilizer distributor jackshaft 6 is interrupted.

The clutch elements 31 and 32 are connected and disconnected by the action of a pair of relatively shiftable clutch throwout cam members 51 and 52. The clutch throwout member 51 is a relatively stationary member and comprises a ring section 54 and an arm section 55, the latter including a hook portion 56 which is adapted to engage over a flanged bushing 57 on the rockshaft 24, whereby the member 51 is anchored against rotation and may thus serve as the stationary member of the clutch control parts. The ring section 54 has a relatively large central opening 58 which embraces the toothed portion 33 of the cam element 31 and is provided with a plurality of cam lugs 59 distributed uniformly about the ring section 54. Each cam lug 59 includes an angled or inclined edge portion 61 and an outer or dwell portion 62 in which a notch 63 is formed.

Figure 5:
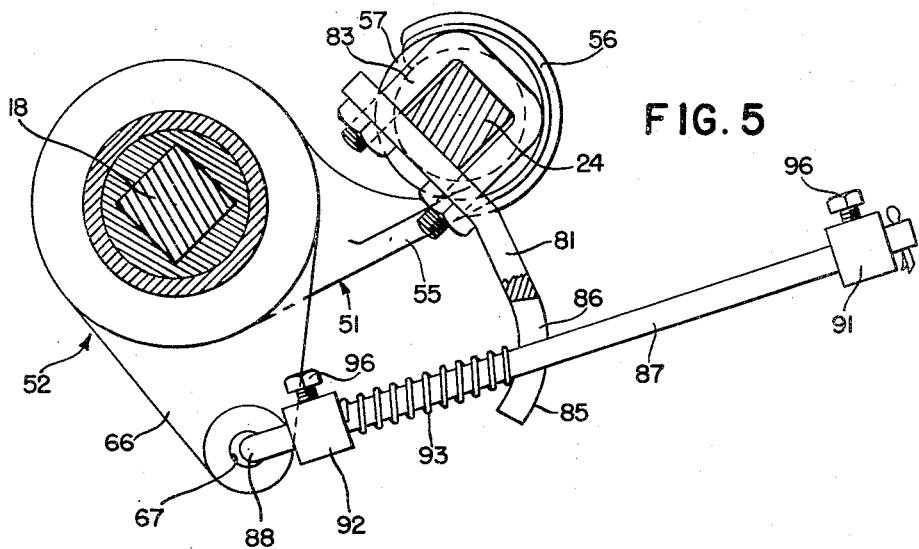
Figure 5 is a view somewhat similar to Figure 1 but with the clutch operating linkage in a disconnected position whereby the fertilizer drive clutch may be maintained in a disengaged position even when the tools are lowered.

The relatively movable clutch controlling cam member 52 also includes a ring section 65 and an arm section 66 which is apertured, as at 67, to receive a controlling or throwout rod which will be referred to later. The ring section 65 of the cam member 52 has a central opening 70 sufficiently large to receive the toothed or lug portion of the other clutch element 32. The ring section 65 is provided with a plurality of uniformly spaced cam lugs 68, each of which has an inclined or angled cam section 71 and an outer dwell portion 72 between which and the angled section 71 is a small projection 73. The angle of the lug faces or edges 71 is substantially the same as the angle of the faces or edges 61 on the cam lugs 59. An outwardly projecting stop lug 75 is formed on the cam member 52 and a corresponding outwardly extending lug 76 is formed on the stationary cam member 51. These lugs prevent the cam members 51 and 52 from being moved too far past their clutch disengaging position, particularly when operated manually as shown in Figure 5. When the shiftable cam member 52 is swung into a position, such as that shown in Figure 2, the cam lugs 68 lie between the cam lugs 59 on the other clutch control member. This permits the spring 45 to force the jaw clutch members 31 and 32 into engagement, whereby the drive is transmitted from the jackshaft 18 through the sprocket and chain gearing to the fertilizer distributor jack shaft 6.

For controlling the engagement and disengagement of the clutch elements 31 and 32 automatically according to the raising and lowering of the tools by the rocking of the rockshaft 24, a throwout arm 81 is clamped, as by a U-bolt 83, to the rockshaft 24. The arm 81 includes a curved outer end 85, having a slot 86 therein. A clutch throwout rod 87 has an inner laterally bent end 88 extended through the opening 67 in the arm 66 of the clutch control cam member 52, the other end of the throwout rod 87 extending loosely through the slot 86. A pair of abutment blocks 91 and 92 are disposed on the rod 87, and a compression spring 93 is mounted between the curved portion 85 of the throwout arm 81 and the abutment block 92. The blocks 91 and 92 are adapted to be fixed in different positions on the rod 87 by any suitable means, such as a set screw 96.

Figure 4:
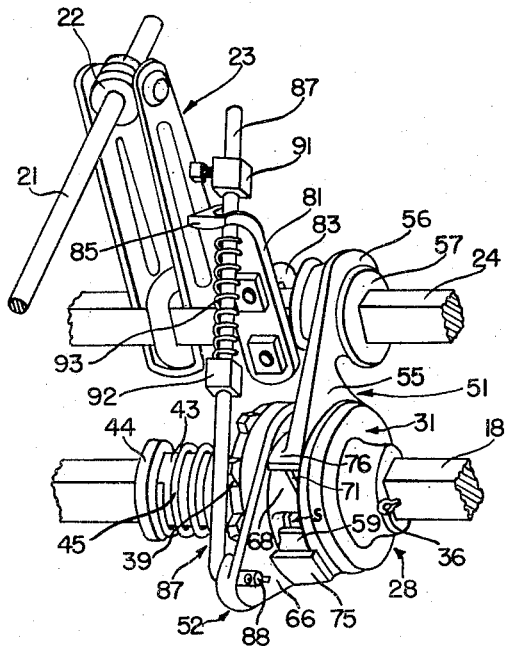
Figure 4 is a fragmentary perspective view, taken generally from the underside of the grain drill, showing the position of the clutch and associated parts when the tools are lowered and the clutch is in driving engagement.

The operation of the clutch mechanism and associated parts is substantially as follows:

Figures 1 and 2 show the parts in the positions they occupy when the fertilizer drive clutch mechanism is engaged, with the tools in their most shallow operation. When the shaft 24 is rocked in an upward direction, to raise the tools into a transport position, the clutch throwout arm 81 is swung upwardly to the position shown in dotted lines in Figure 1. This acts against the abutment block 91 to exert a pull through the control rod 87, swinging the arm 66 forwardly and causing the inclined faces 71 of the cam lugs 68 to ride upwardly on the corresponding inclined or angled faces 61 of the cam lugs 59 on the stationary cam member 51. This relative movement between the two sets of cam lugs causes the shiftable cam member 52 to separate from the stationary cam member 51 and, in doing so, the jaw clutch member 32 is moved axially away from the other jaw clutch member 31 whereby the clutch teeth 33 and 34 are separated, thereby interrupting the drive to the fertilizer distributor shaft. During the aforesaid movement of the clutch controlled cam members, the shiftable cam member 52 is not moved through such a distance that the projections 73 can ride into the notches 63 on the other cam member. When the throwout arm 81 on the rockshaft 24 is moved from its dotted line position (Figure 1) to its full line position, the cam member 52 is shifted relative to the cam member 51 so as to permit the member 52 to approach the member 51 and thus cause the engagement of the driving and driven clutch members 31 and 32. It may be that deeper operation is desired and in that case the rockshaft 24 is rocked in a clockwise direction, Figure 1, an additional amount. This also rocks the throwout arm 81 an additional amount. However, this additional movement does not affect the engagement of the clutch since, in the first place, it is possible for the cam members 51 and 52 to move a slight additional amount in a backward direction after the clutch elements are engaged, due to the space indicated by the character S in Figures 2 and 4, and in the second place, after the space is taken up, which is when the perpendicular edges of the cam lugs on one cam member are against the perpendicular edges or ends of the cam lugs on the other member and no further relative movement between the cam control members 51 and 52 is possible, further movement of the throwout arm 81 toward the left in Figure 1 is accommodated by compression of the spring 93. Ordinarily, the rear cam block 92 is set on the rod 87 at such a point that by the time the arm 81 is moved from its dotted line position into its full line position (Figure 1) the clutch elements are moved into their engaged position.

Under some conditions, it may be desired to sow or plant without distributing fertilizer, and in that event while it is desired to control the operation of the planting unit from the rockshaft 24, it is not desired to operate the fertilizer drive clutch mechanism by the rocking of the rockshaft 24. In that event, the present construction is especially adapted for convenient and easy change over into a completely disengaged position, in which the operation of the throwout arm 81 from its dotted line position to its full line position (Figure 1) does not cause engagement of the fertilizer drive clutch. To perform this change over, all that it is necessary to do is to loosen the rear set screw block 92, shift the same rearwardly as far as it will go, and then tighten to prevent loss. With the abutment block in its rear position, as shown in Figure 5, it will be seen that the rod 87 may now be pulled forward manually a distance sufficient to cause the cam members 51 and 52 to ride one upon the other up into their completely disengaged position, which is defined by the projections 73 on the lugs 68 riding up onto the dwell portions 62 of the companion cam lugs 59 on the cam member 61, coming to rest when the parts are brought into this position. The fertilizer drive clutch then remains permanently disengaged until the rear abutment block 92 and spring 93 have been brought back into the position shown in Figure 1.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a grain drill or the like having a driving shaft and a rockshaft, a pair of driving and driven clutch elements adapted to be mounted on the driving shaft, a pair of clutch control members, one of which is adapted to be disposed for rocking movement relative to said clutch elements and having cooperating, mutually reacting cam portions, means operatively connected with said rockshaft for rocking said one clutch control member, the other of said control members having a hook-like portion including sections spaced apart adapted to provide for passing said hook-like portion into embracing relation with respect to said rockshaft, and a collar adapted to be mounted on said rockshaft and slidable thereon into cooperating engagement with the spaced-apart sections of said hook-like portion for holding said other clutch control member against rocking movement on the associated clutch element.

2. In a grain drill, a rotatable driving member and a rockable member mounted adjacent one another, clutch mechanism mounted on said driving member and including a pair of clutch members, one movable relative to the other into clutch engaging and disengaging positions and into a third normally permanent disengaging position, means for shifting said one clutch member comprising a first part adapted to be connected with said rockable member, a second part connected with said shiftable clutch member, and a third part adjustably mounted on said second part and adapted, in one position, to be engaged by said first part for shifting said shiftable clutch member from one of its engaging and disengaging positions to the other, said third adjustable part being adapted to be shifted on said second part into such position thereon as to accommodate the movement of said one clutch member manually into said normally clutch disengaging position, so that said first part will clear said adjustable part in any position of said first part, and movement of said first part from one position to the other will not move said one clutch member out of normally clutch disengaging position.

3. In a grain drill, a rotatable driving member and a rockable member mounted adjacent one another, clutch mechanism mounted on said driving member and including a pair of clutch members, one movable relative to the other into clutch engaging and disengaging positions and into a third normally permanent disengaging position, cam elements disposed between portions of said clutch members for controlling the connection and disconnection thereof, said cam elements having lugs with angled faces whereby when one cam element is moved relative to the other the angled faces of said cam elements cause a separation of said cam elements and said clutch members, means on the end portions of said lugs for releasably holding said cam elements in their separated position, means for shifting one of said cam elements relative to the other, comprising a first part adapted to be connected with said rockable member, a second part connected with said shiftable cam element, and a third part adjustably mounted on said second part and adapted, in one position, to be engaged by said first part for shifting said shiftable cam element from one of its engaging and disengaging positions to the other, said third adjustable part being adapted to be shifted on said second part into such position thereon as to accommodate the movement of said shiftable cam element manually into said normally clutch disengaging position, so that said first part will clear said adjustable part in any position of said first part, and movement of said first part from one position to the other will not move said shiftable cam element out of its clutch disengaging position.

4. For use in a grain drill or the like which includes a rotatable driving member and a rockable member mounted adjacent one another, clutch mechanism mounted on said driving member and including a pair of clutch members, one movable relative to the other into clutch engaging and disengaging positions and into a third normally permanent disengaging position, cam elements disposed between portions of said clutch members for controlling the connection and disconnection thereof, said cam elements having lugs with angled faces whereby when one cam element is moved relative to the other the angled faces of said cam elements cause a separation of said cam elements and said clutch members, and means on the end portions of said lugs for releasably holding said cam elements in their separated position, the improvement which includes means for shifting one of said cam elements relative to the other, comprising a first part adapted to be connected with said rockable member, a second part adapted to be connected with said shiftable cam element, and a third part adapted to be adjustably mounted on said second part and adapted, in one position, to be engaged by said first part for shifting said shiftable cam element from one of its engaging and disengaging positions to the other, said third adjustable part being adapted to be shifted on said second part into such position thereon as to accommodate the movement of said shiftable cam element manually into said normally clutch disengaging position, so that said first part will clear said adjustable part in any position of said first part, and movement of said first part from one position to the other will not move said shiftable cam element out of its clutch disengaging position.

EUGENE F. SCHMUTZLER.

REFERENCES CITED

The following references are of record in the file of this patent:

UNITED STATES PATENTS

| Number | Name | Date |
|---|---|---|
| 795,808 | Armitage et al. | Aug. 1, 1905 |
| 814,070 | Nelson | Mar. 6, 1906 |
| 836,685 | Hird | Nov. 27, 1906 |
| 1,093,827 | Cameron | Apr. 21, 1914 |
| 1,294,496 | Litchfield et al. | Feb. 18, 1919 |
| 1,405,001 | Reichelt | Jan. 31, 1922 |
| 1,438,486 | Gorman | Dec. 12, 1922 |
| 1,625,769 | Ersted | Apr. 19, 1927 |
| 1,904,563 | Strout | Apr. 18, 1933 |
| 2,332,743 | Morris | Oct. 26, 1943 |
| 2,336,099 | Hyland | Dec. 7, 1943 |

FOREIGN PATENTS

| Number | Country | Date |
|---|---|---|
| 16,981 | Great Britain | of 1911 |
| 482,397 | Germany | Sept. 12, 1929 |